(12) United States Patent
Peeters et al.

(10) Patent No.: US 12,050,703 B1
(45) Date of Patent: Jul. 30, 2024

(54) METHOD OF PERFORMING AN AUTHENTICATION METHOD AND A PAIRING OF A PERIPHERAL DEVICE TO A COMPANION DEVICE

(71) Applicant: STMicroelectronics International N.V., Geneva (CH)

(72) Inventors: Michael Peeters, Tourinnes-la-Grosse (BE); Stephen D. Panshin, Corvallis, OR (US); Jefferson P. Ward, Brush Prairie, WA (US); Kyle L. Michel, Vancouver, WA (US)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/350,495

(22) Filed: Jul. 11, 2023

(51) Int. Cl.
*G06F 15/00* (2006.01)
*G06F 21/60* (2013.01)
*G06F 21/84* (2013.01)

(52) U.S. Cl.
CPC .......... *G06F 21/608* (2013.01); *G06F 21/84* (2013.01)

(58) Field of Classification Search
None
See application file for complete search history.

(56) References Cited

U.S. PATENT DOCUMENTS

| | | | |
|---|---|---|---|
| 2005/0060546 A1* | 3/2005 | Parry | B41J 2/17546 713/171 |
| 2011/0078449 A1* | 3/2011 | Starr | H04L 9/3247 713/168 |
| 2011/0109938 A1* | 5/2011 | Refstrup | G06F 21/57 358/1.15 |
| 2014/0169803 A1* | 6/2014 | Lee | G03G 15/55 399/12 |
| 2019/0207765 A1* | 7/2019 | Panshin | B41J 2/17543 |
| 2022/0327194 A1 | 10/2022 | Peeters | |

* cited by examiner

*Primary Examiner* — Mark R Milia
(74) *Attorney, Agent, or Firm* — Slater Matsil, LLP (57) ABSTRACT

An authentication method is used in pairing a peripheral device to a companion device. The peripheral device sends a first identifier and a first value of a first counter to the companion device. The companion device verifies whether a pairing table stored in the companion device contains the first identifier. When the pairing table does not include the first identifier the companion device initiates a pairing session. When the pairing table includes the first identifier, the companion device compares the first value to a second value associated with the first identifier in the pairing table. In response to the first value being greater than the second value, the companion devices initiates a nominal session and in response to the first value being lower than or equal to the second value, execution of the method is stopped.

30 Claims, 6 Drawing Sheets

METHOD OF PERFORMING AN AUTHENTICATION METHOD AND A PAIRING OF A PERIPHERAL DEVICE TO A COMPANION DEVICE

TECHNICAL FIELD

The present disclosure relates generally to electronic devices or circuits and, in particular embodiments to a pairing table.

BACKGROUND

Communication between two electronic devices or circuits is often preceded by an authentication phase. During this phase, an authentication method, implemented by the two devices, verifies whether the two devices are authorized to communicate with each other.

Authentication methods are often used in communications between a terminal-type device such as a computer, printer, or payment terminal, and peripheral-type electronic equipment or a device, such as a consumable or an accessory. In this case, the authentication method enables the peripheral-type device's access to the terminal-type device's data and/or functionalities to be validated. The authentication method is a primary means of protection against malicious devices attempting to access the data and/or functionality of other devices.

A common example of an authentication method used between a computer and a user, for example, is the use of a user ID and password.

It would be desirable to be able to improve the known authentication methods for electronic devices, at least in part.

SUMMARY

The present disclosure applies to an authentication method between two electronic devices or circuits preceding a method of communication between these two devices or circuits, for example.

Embodiments can provide more reliable authentication methods. For example, embodiments can provide more reliable authentication methods that use information from previous attempts of execution of the authentication method.

Embodiments address all or some of the drawbacks of known authentication methods.

According to a first aspect, one embodiment provides an authentication method wherein a peripheral device is capable of refusing the execution of the authentication method because of previous attempts of the authentication method.

One embodiment provides an authentication method wherein a companion device is capable of refusing the execution of the authentication method because of previous attempts of the authentication method.

One embodiment provides an authentication method wherein a peripheral device is capable of refusing the execution of the authentication device if it has already been paired with too many companion devices.

One embodiment provides an authentication method wherein a peripheral device is capable of refusing the execution of the authentication device if it has already executed too many attempts of execution of the authentication method.

An embodiment provides an authentication method, in view of a pairing, of a peripheral device to a companion device comprising the following steps: (a) the peripheral device sends to the companion device a first identifier and a first value of a first counter; and (b) the companion device verifies if a pairing table that it contains the first identifier. When the pairing table does not include the first identifier, the companion device initiates a pairing session and, when the pairing table includes the first identifier, the companion device compares the first value to a second value associated to the first identifier in the pairing table. If the first value is greater than the second value, the companion device initiates a nominal session and if the first value is lower than or equal to the second value, the companion device stops the execution of the authentication method.

According to an embodiment, during a pairing session, the peripheral device and the companion device exchange data in order to verify if they can be paired together or not.

According to an embodiment, during a pairing session, the peripheral device and the companion device generate a shared key.

According to an embodiment, during a pairing session, the peripheral device and the companion device exchange encrypted commands.

According to an embodiment, if the pairing session is a success, the peripheral device and the companion device are paired together and they use the shared key.

According to an embodiment, if the pairing session is a fail, the peripheral device and the companion device are not paired together.

According to an embodiment, during a nominal session, the peripheral device and the companion device has already been paired together previously, the peripheral device has already stored, at least, a second identifier associated to the companion and a shared key, and the companion device has already stored the shared key.

According to an embodiment, the shared key has been produced during a previous successful pairing session executed by the peripheral device and the companion device.

According to an embodiment, the first counter is incremented at each attempt of execution of the authentication method.

According to an embodiment, during step (b), if the companion device has not previously stored the first identifier, the companion device stores the first identifier and the first value.

According to an embodiment, the peripheral device and the companion device communicate with each other via a host device.

According to an embodiment, the authentication method further comprises a step (c), before step (a), wherein the host device sends, to the peripheral device, a second identifier associated with the companion device.

According to an embodiment, the authentication method further comprises a step (d), between step (c) and step (a), wherein the peripheral device verifies if it has previously stored the second identifier.

According to an embodiment, comprising a step (e), after step (d), wherein, if the peripheral device has not previously stored the second identifier, the peripheral device compares the first value to a first threshold value.

According to an embodiment, during step (e), if the first value is lower than a first threshold value, next step is step (a).

According to an embodiment, during step (f), if the first value is equal or greater than the first threshold value, the peripheral device stops the execution of the authentication method.

According to an embodiment, during step (e), if the peripheral device has previously stored the second identifier, next step is a verification step (f).

According to an embodiment, during step (f), the peripheral device stores the second identifier.

According to an embodiment, during step (f), the peripheral device verifies at least one first data stored with the second identifier.

According to an embodiment, during step (f), the at least one first data stored is a second value of a second counter.

According to an embodiment, the second counter is incremented at each attempt of execution of the authentication method with the companion device.

According to an embodiment, during step (f), the peripheral device compares the second value to the second threshold value.

According to an embodiment, during step (f), if the second value is lower than a first threshold value, next step is step (a).

According to an embodiment, during step (f), if the second value is equal or greater than the second threshold value, next step is step (g).

According to an embodiment, the second threshold value is comprised between one and five.

According to an embodiment, the second threshold value is equal to three.

According to an embodiment, during step (g), the peripheral device stops the execution of the authentication method.

According to an embodiment, the companion device is a circuit for a printer.

According to an embodiment, the peripheral device is a circuit for an ink cartridge.

Another embodiment provides an electronic peripheral device configured to be a peripheral device in an authentication method, in view of a pairing, of the peripheral device to a companion device comprising the following steps: (a) the peripheral device sends to the companion device a first identifier and a first value of a first counter; and (b) the companion device verifies if a pairing table that it contains the first identifier. When the pairing table does not include the first identifier, the companion device initiates a pairing session and, when the pairing table includes the first identifier, the companion device compares the first value to a second value associated to the first identifier in the pairing table. If the first value is greater than the second value, the companion device initiates a nominal session and if the first value is lower than or equal to the second value, the companion device stops the execution of the authentication method.

Another embodiment provides an electronic companion device configured to be a companion device in an authentication method, in view of a pairing, of a peripheral device to the companion device comprising the following steps: (a) the peripheral device sends to the companion device a first identifier and a first value of a first counter; and (b) the companion device verifies if a pairing table that it contains the first identifier. When the pairing table does not include the first identifier, the companion device initiates a pairing session and, when the pairing table includes the first identifier, the companion device compares the first value to a second value associated to the first identifier in the pairing table. If the first value is greater than the second value, the companion device initiates a nominal session and if the first value is lower than or equal to the second value, the companion device stops the execution of the authentication method.

Another embodiment provides an electronic system comprising a peripheral device, and a companion device, the peripheral device and the companion device are configured to implement an authentication method, in view of a pairing, of the peripheral device to the companion device comprising the following steps: (a) the peripheral device sends to the companion device a first identifier and a first value of a first counter; and (b) the companion device verifies if a pairing table that it contains the first identifier. When the pairing table does not include the first identifier, the companion device initiates a pairing session and, when the pairing table includes the first identifier, the companion device compares the first value to a second value associated to the first identifier in the pairing table. If the first value is greater than the second value, the companion device initiates a nominal session and if the first value is lower than or equal to the second value, the companion device stops the execution of the authentication method.

Another embodiment provides a non-transitory computer-readable medium storing a program which, when executed by a microprocessor in devices of the electronic system previously described, causes the devices to perform the method previously described.

The features described in relation described previously in relation to methods can be transposed into system features dedicated to any device of the invention.

According to a second aspect, an embodiment provides an authentication method wherein a host device, used for communication purposes between a peripheral device and a companion, does not have access to sensitive data during a pairing session.

An embodiment provides an authentication method, in view of a pairing, of a peripheral device to a companion device, via a host device, wherein, when a pairing session is initiated, a first command is received by the host device, wherein the first command comprises a first command code and a first encrypted payload to be exchanged between the peripheral device and the companion device via the host device, the first command code indicating to the host device to transfer the command without decoding it.

According to an embodiment, the first encrypted payload comprises at least an encrypted second command code.

According to an embodiment, the encrypted payload further comprises at least one encrypted first parameters associated with the second command code.

According to an embodiment, the command comprises a first verification code of the encryption of the first encrypted payload.

According to an embodiment, when the companion device or the peripheral device receives the encrypted command, the companion device or the peripheral device decrypts the first encrypted payload.

According to an embodiment, when the companion device or the peripheral device receives the encrypted command, the companion device or the peripheral device decrypts the first encrypted payload using a pairing session key.

According to an embodiment, once the encrypted command is decrypted, the companion device or the peripheral device verifies that the second command code is adequate.

According to an embodiment, once the encrypted command is decrypted, the companion device or the peripheral device verifies that the at least one first parameter is adequate.

According to an embodiment, once the encrypted command is decrypted, the companion device or the peripheral device executes the at least one operation associated with the second command code.

According to an embodiment, once the at least one operation is executed, the companion device or the peripheral device generates a first response.

According to an embodiment, the first response comprises at least a first response command.

According to an embodiment, the first response further comprises at least a second parameter.

According to an embodiment, the first response is then encrypted.

According to an embodiment, the first response is then encrypted, by the companion device or the peripheral device, with the pairing session key.

According to an embodiment, the companion device or the peripheral device generates a second encrypted command comprising, in the following order:
  the first command code;
  a second encrypted payload the encrypted first response; and
  a second verification code of the encryption of the second encrypted payload.

According to an embodiment, the companion device or the peripheral device sends the second encrypted command to the peripheral device or the companion device, via the host device.

According to an embodiment, the authentication method comprises, before the pairing session, an identification session.

According to an embodiment, during the identification session, the companion device decides if the pairing session is needed or not.

According to an embodiment, when the companion device decides if the pairing session is needed, the companion device sends, to the host device, a second encrypted response.

According to an embodiment, the second encrypted response comprising, in the following order:
  a second response code indicating to the host device that the authentication method continues;
  a first status data indicating the pairing session initiates;
  a third encrypted payload comprising a third encrypted command; and
  a third verification code of the encryption of the second encrypted payload.

According to an embodiment, the peripheral device is a circuit for ink cartridge.

According to an embodiment, the companion device is a circuit for printer.

According to an embodiment, the host device is a circuit for printer.

Another embodiment provides an electronic companion device configured to implement, as a companion device, an authentication method, in view of a pairing, of a peripheral device to the companion device, via a host device, wherein, when a pairing session is initiated, a first command is received by the host device, wherein the first command comprises a first command code and a first encrypted payload to be exchanged between the peripheral device and the companion device via the host device, the first command code indicating to the host device to transfer the command without decoding it.

Another embodiment provides an electronic peripheral device configured to implement, as a peripheral device, an authentication method, in view of a pairing, of the peripheral device to a companion device, via a host device, wherein, when a pairing session is initiated, a first command is received by the host device, wherein the first command comprises a first command code and a first encrypted payload to be exchanged between the peripheral device and the companion device via the host device, the first command code indicating to the host device to transfer the command without decoding it.

Another embodiment provides an electronic host device configured to implement, as a host device, an authentication method, in view of a pairing, of a peripheral device to a companion device, via the host device, wherein, when a pairing session is initiated, a first command is received by the host device,
  wherein the first command comprises a first command code and a first encrypted payload to be exchanged between the peripheral device and the companion device via the host device, the first command code indicating to the host device to transfer the command without decoding it.

Another embodiment provides an electronic system comprising a companion device, a peripheral device, and a host device, all capable of implementing an authentication method, in view of a pairing, of the peripheral device to the companion device, via the host device, wherein, when a pairing session is initiated, a first command is received by the host device, wherein the first command comprises a first command code and a first encrypted payload to be exchanged between the peripheral device and the companion device via the host device, the first command code indicating to the host device to transfer the command without decoding it.

The features described previously in relation to methods can be transposed into system features dedicated to any device of the invention.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Same features have been designated by same references in the various figures. In particular, the structural and/or functional features that are common among the various embodiments may have the same references and may dispose identical structural, dimensional, and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around," "approximately", "substantially" and "in the order of" signify within 10%, and preferably within 5%.

The embodiments described hereafter concern the authentication, in view of pairing, of a peripheral device to a companion device, and more particularly the step of an authentication method and the sequence of data exchanged during the authentication method.

According to a first aspect, the authentication method may comprise a first identification operation wherein the peripheral device and the companion device determine if they have been in contact before or not.

In case when the two devices have been paired before, a next operation is a nominal operation wherein the two devices are paired using pairing data stored in pairing tables comprised in each device.

In case when the two devices have not been paired before, each device executes verifications in order to determine if the other device is malicious or not. If neither of the devices is considered as malicious, a pairing operation is initiated. Various operations and verifications are described below.

These authentication methods present the advantage of giving the capability to the companion device of refusing the execution of the authentication method because of previous attempts of the authentication method.

These authentication methods present the other advantage of giving the capability to the peripheral device of refusing the execution of the authentication device if it has already been paired with too many companion devices, or if it has already executed too many attempts of execution of the authentication method.

According to a second aspect, during the authentication method the two devices are communicating via a host device.

The host device acts as a master device of the communication during the authentication method, except during the execution of the pairing operation.

Thus, during the pairing operation, the host device should be transparent and is supposed to transfer command from the peripheral device to the companion device, or from the companion device to the peripheral device, without decoding the command.

In the second aspect, it is thus proposed to use a specific command format, such that each command comprises a specific field described hereafter indicating to the host device that its role is only to transfer the command without further processing.

An advantage of the second aspect is that the host device, used for communication purposes between a peripheral device and a companion, does not have access to sensitive data during a pairing session.

Figure 1:
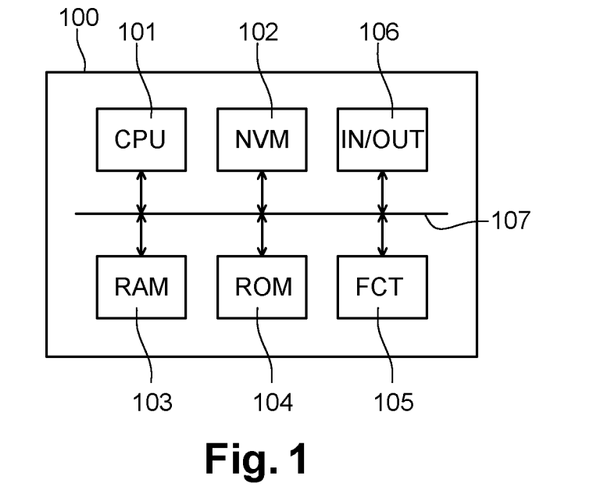
FIG. 1 shows, schematically and in block form, an electronic device to which the embodiments described below can be applied.

FIG. 1 shows, very schematically and in block form, an example architecture of an electronic device 100.

The electronic device 100 comprises a processor 101 (CPU) adapted to implement various instructions to process data stored in the memories of and/or provided by another circuitry to the device 100.

The electronic device 100 may further comprises different types of memories, including non-volatile memory 102 (NVM), volatile memory 103 (RAM), and/or read-only memory 104 (ROM). Each memory is adapted to store different types of data. The device 100 may have one or more of these different types of memories, and/or have memories of only one or two of these types.

The electronic device 100 further comprises different circuits 105 (FCT) adapted to perform different functions. By way of example, the circuits 105 may comprise measurement circuits, data conversion circuits, cryptographic circuits, or circuits performing cryptographic operations, such as encryption circuits, etc. Hereafter are called cryptographic circuits, circuits that are execute cryptographic functions and/or operations, and are called encryption circuits, circuits that are using cryptographic functions and/or operations for the purpose of encrypting and/or decrypting data, or for the purpose of ciphering and/or deciphering data.

The electronic device 100 may further comprise interface circuits 106 (IN/OUT) adapted to send and/or receive data from outside the device 100. The interface circuitry 106 may be further adapted to implement a data display such as a display screen. The electronic device 100 is further particularly adapted to communicate and/or to be paired with other electronic devices, and to implement an authentication method to authorize such communication and/or such pairing.

The electronic device 100 further comprises one or more data buses 107 adapted to transfer data between its various components. In particular, the bus 107 is used to transfer data stored in the memories 102 to 104 to the processor 101, circuits 105, and/or interface circuits 106.

Figure 2:
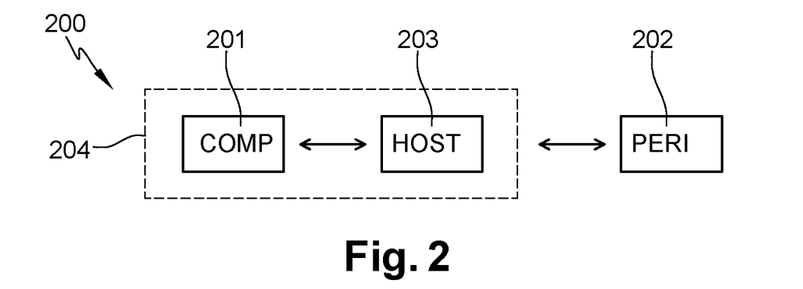
FIG. 2 shows, schematically, an example of a system capable of executing the embodiments described below.

FIG. 2 shows an example of an electronic system 200 capable of executing authentication method embodiments described hereafter.

The electronic system 200 is composed of three electronic devices of the type of the electronic device 100 described in relation with FIG. 1. More particularly, the electronic system 200 is composed of a companion device 201 (COMP), a peripheral device 202 (PERI), and a host device 203 (HOST).

The companion device 201 is a terminal-type device that is configured to function with the peripheral device 203.

The peripheral device 202 is a peripheral-type device, and more particularly device 202 can be a consumable, adapted to be used by companion device 201.

The host device 203 is a host-type device or a router-type device used to operate a communication between devices 201 and 202. In other words, host device 203 is able to communicate with companion device 201, and with peripheral device 202, and is able to transfer data from companion device 201 to peripheral device 202 or from peripheral device 202 to companion device 201. Devices 201 and 202 are not configured to exchange directly data with each other.

According to an example, the companion device 201 and the host device 203 can be part of a same main electronic device 204. In that case, the companion device 201 is, for example, an electronic circuit dedicated to the use of a consumable, and device 202 is, for example, a main processor of the main electronic device 204. According to a variant, the companion device 201 and the host device 203 can be executed by a same electronic circuit, such as a secure element.

According to an embodiment, devices 201 and 202 are configured to work in cooperation and are configured to communicate with each other by using the host device 203 at least as a communication tool and at most as the master of the communication. More particularly, system 200 is configured to implement an authentication method for the purpose of authenticating the peripheral device 202 to the companion device 201 using the host device 203 as a communicating tool. In other words, each device 201, 202, and 203 is configured to implement a part of the authentication method. According to an embodiment, the authentication method has two goals, the first goals being verifying if the devices 201 and 202 are authorized to work, or at least communicate, with each other, and the second goal being the generation of a shared cryptographic key, called hereafter shared key, used during a following communication to encrypt and/or decrypt all or parts of the data exchanged by the devices 201 and 202, and/or for authentication purposes detailed hereafter. If the authentication method results in a success, or is successful, the devices 201 and 202 are paired.

According to some embodiments, this authentication method may further verify the hardware and/or software compatibility of the devices 201 and 202. According to another example, this authentication method may be able to prevent a malicious device from accessing sensitive or secret data stored in the devices 201 and 202.

An example of implementation and of authentication method embodiments are described in relation with FIGS. 5 to 8.

Figure 3:
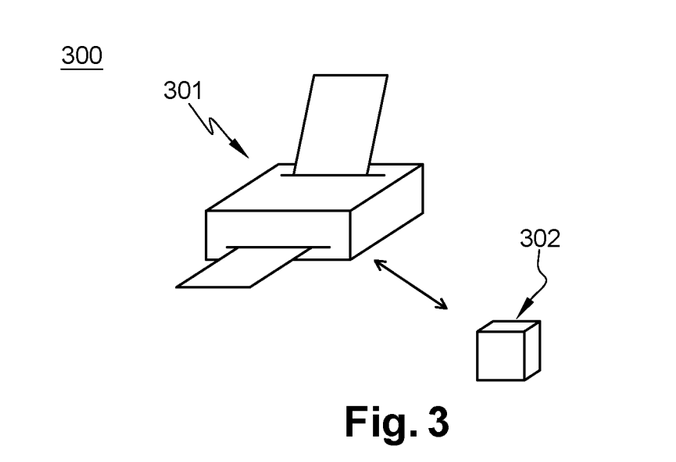
FIG. 3 shows, schematically, a practical example of an embodiment of a system of FIG. 2.

FIG. 3 shows a practical system of an electronic system 300 of the type of the electronic system described in relation with FIG. 2. FIG. 3 shows, more particularly, a system composed of a printer 301 and an ink cartridge 302.

The printer 301 and the ink cartridge 302 are devices of the type of device 100 described in relation with FIG. 1.

The printer 301 acts like, or comprises a circuit that acts like, the companion device 201 and the host device 203 of system 200 of FIG. 2. More particularly, printer 301 comprises a main circuit, for example a processor or a secure element, acting as the host device 203, and a circuit dedicated to pilot the ink cartridge 302 acting as the companion device 201. The main circuit and the dedicated circuit are not represented in FIG. 3.

The ink cartridge 302 acts like, or comprises a circuit that acts like, the peripheral device 202 of system 200 of FIG. 2.

Figure 4:
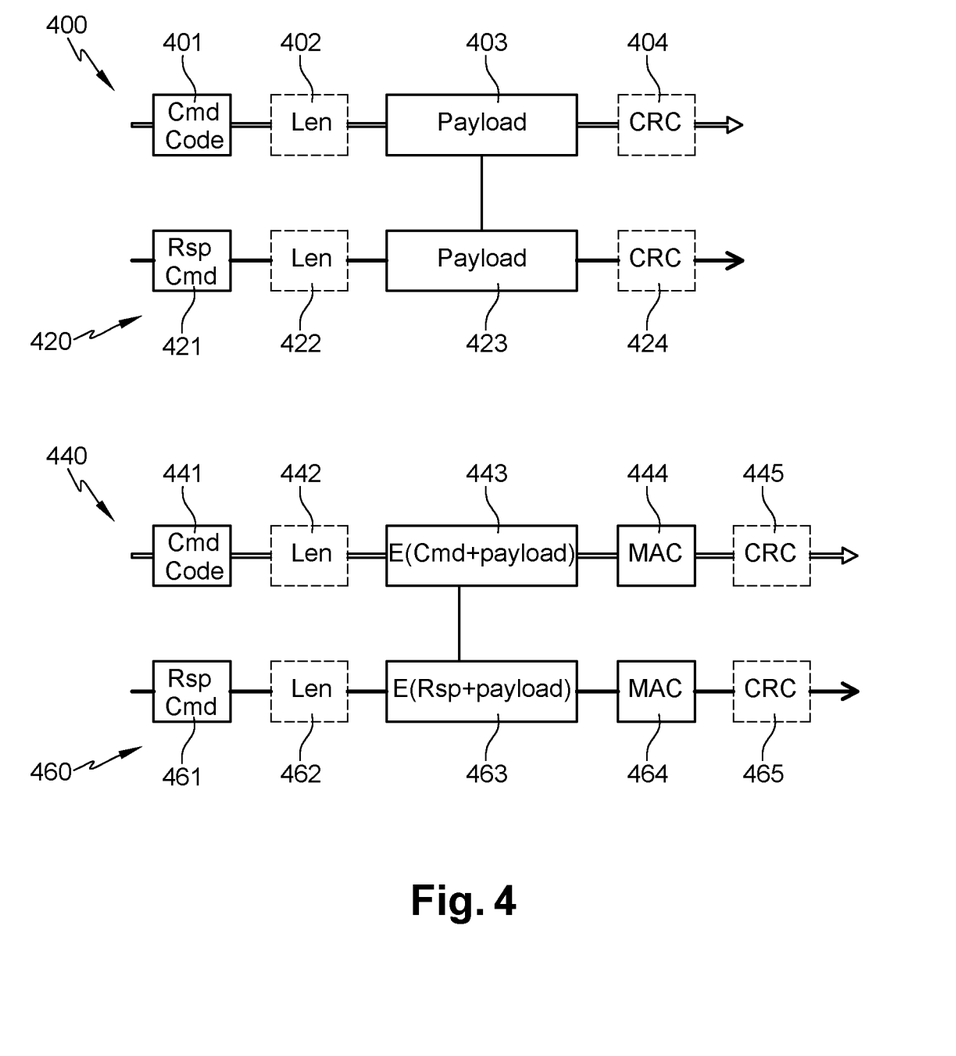
FIG. 4 shows, schematically and in block form, an example of structures of exchanged commands and responses of the system of FIG. 2.

FIG. 4 shows, schematically and in block form, an example of structures of exchanged commands and responses of the system of FIG. 2, or of the system of FIG. 3. More particularly, FIG. 4 shows structures of a command 400, a response 420, an encrypted command 440, and an encrypted response 460.

In the following disclosure, a command is one or a group of data that constitutes a command to be execute by a receiver device. A response is one or a group of data that constitutes a response to a previously received command. Furthermore, in the figures, a command is represented by a double arrow, and a response is represented by a simple thicker arrow.

Command 400, response 420, encrypted command 440, and encrypted response 460 are all composed of a sequence of data arranged in a specific order. Encrypted command 440 represents a specific example of the command 400. Encrypted response 460 represents a specific example of the response 420.

Command 400 comprises a sequence of data comprising, strictly in the following order:
- a command code field 401 (Cmd Code) comprising a data, called command code hereafter, that represents the type of operations executed by the command 400;
- a length data field 402 (Len) comprising a data that represents the length of the sequence of command 400, meaning the number of bytes composing command 400;
- a payload field 403 (Payload) comprising a data, called hereafter payload, that represents data used to execute the command 400; and
- a verification data field 404 (CRC) comprising a verification data of the command 400.

Response 420 comprises a sequence of data comprising, strictly in the following order:
- a response code field 421 (Rsp Code) comprising a data, called hereafter response code 421, that represents the type of the response 420;
- a length data field 422 (Len) comprising a data that represents the length of the sequence of response 420, meaning the number of bytes composing response 420;
- a payload field 423 (Payload) comprising a data, called hereafter payload, that represents data comprised in response 420; and
- a verification data field 424 (CRC) comprising a data that represents a verification data of the response 420.

Data comprised in the command code field 401 only indicates the type, or the category, of command 400, or in other words the type of operations that are executed when the command 400 is implemented. Data comprised in the payload field 403 represents data, also called parameters, used to execute the command 400.

Similarly, response code 421 indicates the type, or the category, of response 420. According to an example, a response code can indicate to which command the response is associated to, or can indicate a result status. Data comprised in the payload field 423 represents data, also called parameters, comprised in response 420.

Moreover, fields 402, 404, 422, and 424, can be optional. In the following disclosure, these fields are omitted. In some cases, having a data in the command code field 401 or the response code field 421 is sufficient for a receiver, and the payload field 403 or 423 is empty.

As said earlier, command 440 and response 460 are both encrypted. Similarly, to command 400 and response 420 described previously, command 440 and response 460 are composed of a sequence of data arranged in a specific order.

Encrypted command 440 comprises a sequence of data comprising, strictly in the following order:
- a command code field 441 (Cmd Code) comprising a data, or command code 441, that represents the type of the command 440;
- a length data field 442 (Len) comprising a data that represents the length of the sequence of command 440, meaning the number of bytes composing command 440;
- an encrypted payload field 443 (E(Cmd+Payload)) comprising an encrypted data, call hereafter encrypted payload 443, that may represents an encrypted data or a command of the type of command 400;

an authentication code field 444 (MAC) comprising a data that represents a message authentication code in relation with the encryption of command 440; and a verification field 445 (CRC) comprising a data that represents a verification data of the command 440.

Encrypted response 460 comprises a sequence of data comprising, strictly in the following order:

a response code field 461 (Rsp Code) comprising a data, called hereafter response code, that represents the type of the response 460;

a length data field 462 (Len) comprising a data that represents the length of the sequence of response 460, meaning the number of bytes composing response 460;

an encrypted data field 463 (E(Rsp+Payload)) comprising a data, called hereafter encrypted payload 463, that may represents an encrypted data or a response of the type of response 420;

an authentication code field 464 (MAC) comprising a data that represents a message authentication code in relation with the encryption of response 460; and a verification data field 465 (CRC) comprising a data that represents a verification data of the response 460.

Command 440 being encrypted, its command code, comprised in the command code field 441, only indicates that command 440 is an encrypted command without disclosing the type of command 440. In other words, data comprised in the command code field 441 does not disclose the type of operations that the command 440 is executing. As said before, the encrypted payload field 443 comprises an encrypted data that can represent a command of the type of command 400, meaning that the encrypted payload field can comprise an encrypted command code and, if appropriates, an encrypted payload. The encrypted command code is the real command code of the command 440, indicating the type of command 440. If appropriate, the encrypted payload comprises the data used by the command 440 to be executed.

According to an example, when a device receives the encrypted command 440, the command code indicates that command 440 is encrypted. Thus, the device decrypts the encrypted payload in order to get the real command code and, if appropriate, the real payload of the command 440. Once the payload is decrypted, the device can execute command 440. If a device is not capable of decrypting or decoding the encrypted payload, it is not capable of executing the command 440.

Similarly, response 460 being encrypted, its response code comprised in the response code field 461 only indicates that response 460 is an encrypted response without disclosing the type of response 460. The encrypted payload comprised in the encrypted payload field 463, on the other hand, can comprises an encrypted data that is composed of, strictly in the following order, of the real response code of the response 460 and the payload of the response 460. The real response code indicates the type of response 460. The parameters of the response 460 are the data composing the response.

According to an example, when a device receives the encrypted response 460, the response code indicates that response 460 is encrypted. Thus, the device decrypts the encrypted payload in order to get the real response code and, if appropriate, the real payload of the response 460. Once the payload is decrypted, the device can have access to data comprised in response 460. If a device is not capable of decrypting the encrypted payload, it is not capable of getting access to data comprised in response 460.

Similarly, data 442, 444, 462, and 464 can be optional. In some cases, the command code 441 or the response code 461 is sufficient for a receiver, and payload 443 or 463 is empty.

In a variant the sequence of data composing a command or a response can be in a different order that the one described in relation with FIG. 4.

Figure 5:
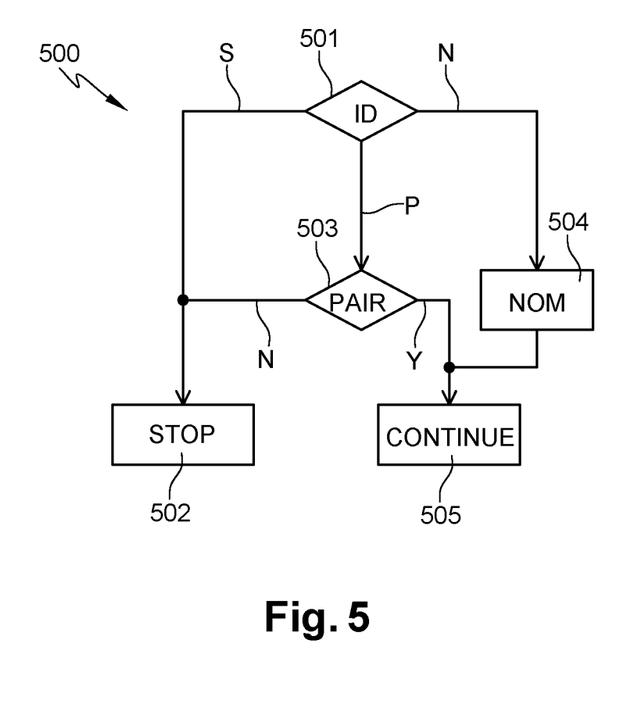
FIG. 5 shows a block diagram illustrating briefly an embodiment of an authentication method.

FIG. 5 shows a simplified block diagram 500 illustrating an embodiment of an authentication method executed by the system 200 described in relation with FIG. 2 and using commands and responses described in relation with FIG. 4.

According to an embodiment, the authentication method starts with the execution of an identification operation 501 (ID) wherein the companion device 201 and the peripheral device 202 determine if they already know each other or not, that is if they have already been paired together or not. More particularly, during this operation, the companion device 201 and the peripheral device 202 identify if they have already tried, successfully or not, to execute the present authentication method. A detailed presentation of the identification operation is made in relation with FIG. 6.

For that matter, and according to an embodiment, the companion device 201 stores in a pairing table:

its own identification data IDComp, or identifier IDComp;

a list of pairing master keys;

a list of pairing master key identifiers; and a list of groups of data, each group comprising an identification data, or identifier, a shared key, and a value of a session counter, each group corresponding to a peripheral device that have been previously successfully authenticated with the companion device 201.

More precisely, the identifier IDComp is a unique data that identify the companion device 201. The lists of pairing master keys and of pairing master key identifiers are used by the companion device 201 to execute a pairing operation, or pairing session, detailed hereafter.

According an embodiment, the list of groups of data is representative of all, or part of, peripheral devices to which the companion device 201 have been successfully authenticated with. The identification data comprised in the group represents the identifier of a peripheral device. The shared key corresponds to decryption and/or encryption key associated to the peripheral device, that has been generated during a pairing operation executed successfully with the peripheral device. The value of a session counter represents the value of a counter stored in each peripheral device, the counter being presented in more details hereafter.

Moreover, according to an embodiment, the peripheral device 202 stores in a pairing table:

its own identification data IDPeri, or identifier IDPeri;

a list of pairing base keys;

a list of pairing base key identifiers;

a list of groups of data, each group corresponding to a device to which the peripheral device have tried previously to be authenticated to; and several counters and limit data that represents limits to the previous counters.

More precisely, the identifier IDPeri is a unique data that identify the peripheral device 202. The lists of pairing base keys and of pairing base keys identifiers are used by the peripheral device to execute the pairing operation detailed hereafter.

According an embodiment, the list of groups of data comprises data representative of all companion devices to which the peripheral device have been successfully, or not, authenticated with. Each group of data comprises:

an identifier of a companion device;

when appropriate, a shared key corresponding to an decryption and/or encryption key associated to the companion device, that has been generated during a pairing operation executed successfully with the companion device; and optionally, a data PairCnt that represents the value of a counter updated at each attempts of execution of the authentication method with the companion device.

The several counters and limit data of the pairing table of the peripheral data may comprise:

- a counter SessionCnt that is incremented at each new attempts of execution of the authentication method with any companion devices;
- a limit data SessionCntLim that represents the maximum number of attempts of execution of the authentication method with any companion devices;
- optionally, a limit data PairCntLim that represents the maximum number of attempts of execution of the authentication method with one particular companion device, and
- optionally, a counter GPairCnt that represents the number of attempts of execution of the authentication method with any companion devices;
- optionally, a limit data GPairCntLim that represents the maximum number of attempts of execution of the authentication method with any companion devices.

According to an example, limit data SessionCntLim is lower than several millions, and is, for example equal to one million. Limit data PairCntLim is comprised between one and five, and is, for example equal to three.

Figure 6:
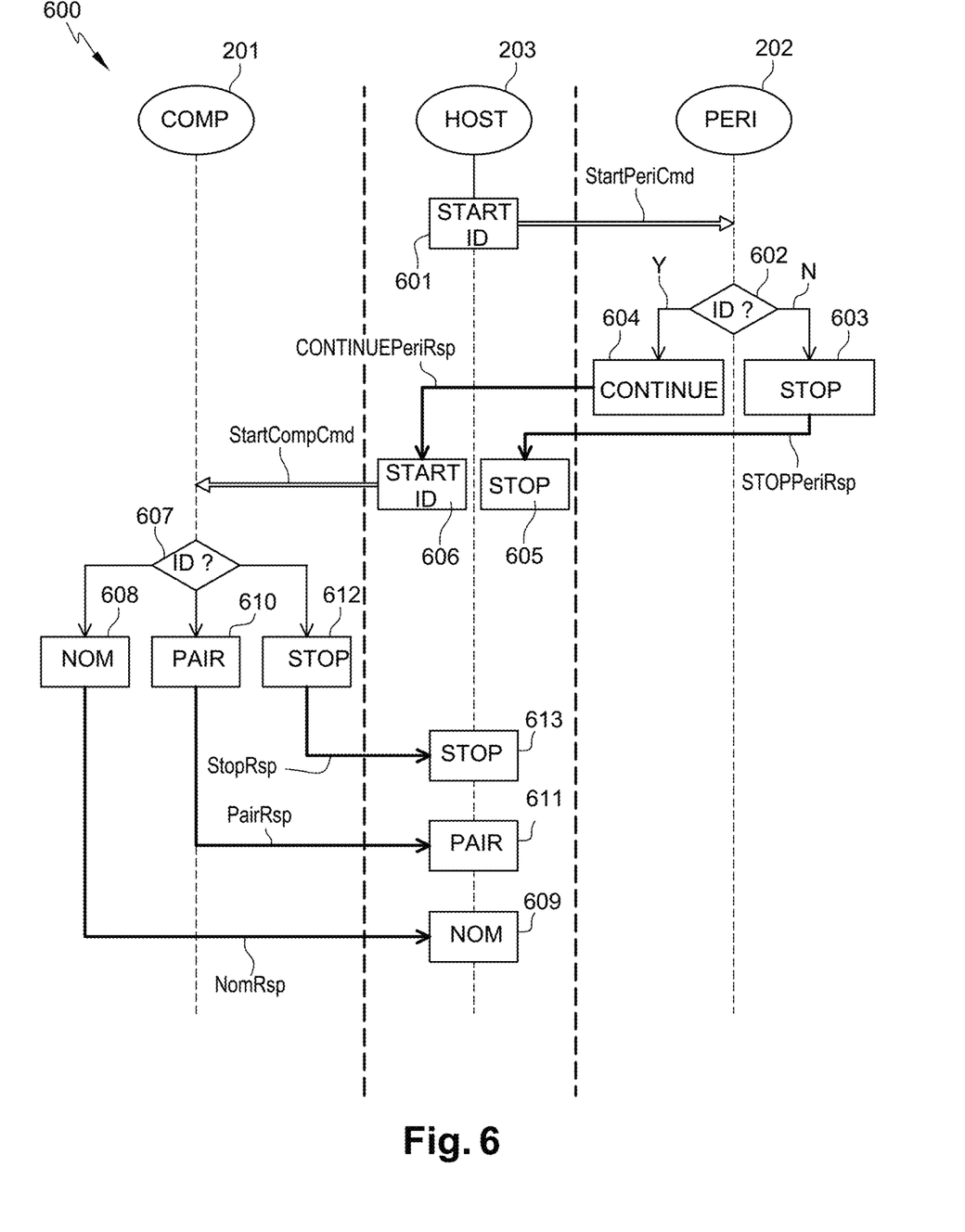
FIG. 6 shows a block diagram illustrating a part of the embodiment of the FIG. 5.

The uses of the pairing tables of the companion device 201 and of the peripheral device 202 is described more in details in connection with FIG. 6.

Moreover, during the identification operation, the host device 203 is a master device of the communication. In other words, the host device 203 has the leading position of the communication, and it has the role of sending commands to the companion device 201 and to the peripheral device 202 and to execute the identification operation. A detailed explanation of the commands and responses exchanged in the system 200 during identification operation is made in connection with FIG. 6 and FIG. 7.

Once the identification operation is executed, the companion device 201 and the peripheral device 202 have determined if they have already been in contact, or even paired, before. Three situations are possible here.

According to a first situation, the devices 201 and 202 may decide that they do not want to communicate with each other (output S of operation 501), or to be paired with each other. This situation can happen, for example, when one of the devices detects that the other device is malicious, or, for example, when one on the devices has reached the limit number of pairing session. In that case, the next operation is an operation 502 (STOP).

According to a second situation, the companion device 201 and the peripheral device 202 may decide that they do want to communicate with each other, but they have never been paired with each other (output P of operation 501), or one of the devices 201 or 202 have forgotten that they have been previously paired with each other. In that case, the next operation is a pairing operation 503 (PAIR), or pairing session 503.

According to a third situation, the companion device 201 and the peripheral device 202 recognize each other (output N of operation 501), meaning that they have already been paired with each other and they have stored the required data to be paired together again. The next operation is a nominal operation 504 (NOM), or nominal session 504, wherein the companion device 201 and the peripheral device 202 can use their shared key, obtained in a previous pairing session and stored in their respective pairing table, to establish a secure communication session.

During operation 502, the authentication method fails and stops. According to an example, the companion device 201 stores, in its pairing table, identifier IDPeri and the last value of the counter SessionCnt of the Peripheral device 202. In a variant, the companion device 201 does not store any information about peripheral device 202. The peripheral device 202 stores, in its pairing table, identifier IDComp, and it updates its different counters. After operation 502, companion device 201 and peripheral 202 are not authorized to communicate, via host device 203, with each other.

During the pairing operation 503, companion device 201 and peripheral device 202 decide that they do want to communicate with each other but they do not trust each other yet, and the pairing session is executed. Different verification steps, using, for example, cryptographic operation are executed in order to generate a shared key ShBK shared by the companion device 201 and the peripheral device. A detailed example of the pairing operation 503 is described in more details in connection with FIG. 8. If the pairing operation presents a success (output Y of operation 503), a shared key ShBK is obtained, and the next operation is an operation 505 (CONTINUE). If not (output N of operation 503), the next operation is the operation 502.

Moreover, during the pairing operation 503, the host device 203 becomes a slave device of the communication. In other words, the host device 203 has not the leading position of the communication anymore, and it has the role of transferring commands from the companion device 201 to the peripheral device 202, or from the peripheral device 202202 to the companion device 201. Further, and according to an embodiment, when the host device is a slave device in the communication, every time it receives an encrypted command, its only role is to transfer this encrypted command, and not to try execute or to decode, or decrypt, it.

During the nominal operation 504, or nominal session 504, it has been established that devices 201 and 202 has already been authenticated to each other, and be paired with each other, and in consequence, they trust each other. Devices 201 and 202 has already stored the shared key ShBK, and they can use it to get paired. The host device 203 stays the master device of the communication. In other words, the host device 203 has the leading position of the communication, and it has the role of sending commands to the companion device 201 and to the peripheral device 202. The host device 203 sends commands to the companion device 201 and the peripheral device 202, and receives responses from its.

Moreover, during the nominal operation 504, the companion device 201 and the peripheral device 202 are paired together, and, then, they can communicate with each other via the host device 203. More particularly, companion device 201 and peripheral device 202 can exchange encrypted data and, for that purpose, can use their shared key ShBK. According to an example, devices 201 and 202 use their shared key ShBK for the generation of one or more encryption and/or decryption keys used for encrypting and/or decrypting commands and responses. The peripheral device 202 stores, in its pairing table, identifier IDComp and the shared key ShBK, and it updates its different counters. On its side, the companion device 202 stores, in its pairing table, identifier IDPeri, and the shared key ShBK. The next operation is the operation 505.

During operation 505, the companion device 201 and the peripheral device 202 are paired together, and they are ready to communicate with each other via the host device 203 and by using the shared key ShBK.

FIG. 6 shows a block diagram illustrating in more details an embodiment of an identification operation 600 executed by the system 200 described in relation with FIG. 2 and using commands and responses described in relation with FIG. 4. The identification operation 600 is of the type of identification operation 501 described is connection with FIG. 5.

The identification operation 601 starts with an initial step 601 (START ID), executed by the host device 203, wherein the host device 203 initiate the authentication method by sending a command StartPeriCmd to the peripheral device 202. The command StartPeriCmd comprises the identifier IDComp of the companion device 201, and, optionally, a decryption and/or encryption key KId. The decryption and/or encryption key KId is a key used for generating a pairing session key and/or the shared key ShBK. More particularly, the key KId is used to select which pairing base key to use for deriving the pairing session key, which will be used to encrypt and/or decrypt commands during the pairing session. The command StartPeriCmd is of the type of command 400 described in relation with FIG. 4, meaning that the command StartPeriCmd is not an encrypted command.

At a step 602 (ID?), executed by the peripheral device 202, and following the initial step 601, the peripheral device 202 has received the command StartPeriCmd and decides if it wants to start the authentication method with companion device 201. For that matter, the peripheral device 202 executes some verifications, and more particularly, peripheral device 202 looks for the identifier IDComp and for the encryption key KId in its pairing table. If one of more verifications result in a fail (Output N of step 602), the next step is a step 603 (STOP), and if all the verifications results in a success (Output Y of step 602), the next step is a step 604 (PENDING).

According to a first example, a first verification consists of verifying if the peripheral device 202 has a pairing base key corresponding to the key Kid. The first verification fails if the peripheral device 202 does not have a corresponding key.

According to a second example, a second verification consists of verifying if the identifier IDComp is stored in the pairing table of peripheral device 202.

If the identifier IDComp is found in the pairing table. The peripheral device can verify if the sequence of command StartPeriCmd is correct. The peripheral device 202 verifies if a shared key ShBK is associated to the identifier IDComp. If a shared key ShBK is found, it means that the peripheral device 202 has already been paired previously with the companion device 201, the next step is step 604, and, if appropriate, the counter GPairCnt is incremented. If a shared key ShBK is not found, it means that the peripheral device 202 has not been paired with the companion device 201, the next step is step 604, except if the counter PairCnt exceeds the limit PairCntLim or except if the counter SessionCnt exceeds the limit SessionCntLim.

According to an example, a flag data can be associated to the identifier IDComp. In some cases, the flag data can indicate if the companion device 201 is blocked by the peripheral device 202, in that case the next step is step 603. The peripheral device can update this flag data each time it is necessary.

If the identifier is not found in the pairing table. It means that the peripheral device 202 have never been in contact with the companion device 201. The peripheral device 202 verifies if it can get paired with a new companion device by checking, if appropriate, the counter GPairCnt, and verifying if its value is not greater than the limit GPairCntLim. The next step is step 603 is the peripheral device exceeds the limit number of sessions, and is step 604 is the peripheral device does not exceed the limit number of sessions.

According to a third example, a third verification consists of verifying if the peripheral device 202 can start a new session by checking the session counter SessionCnt, and verifying if its value is not greater than the limit SessionCntLim. The next step is step 603 if the counter exceeds the limit number of sessions. Otherwise, if the counter does not exceed the number of session, the peripheral increments the session count SessionCnt, and the next step is step 604.

Moreover, during step 602, the peripheral device 202 stores, in its pairing table, identifier IDComp, and, eventually, a flag data concerning the attempt of execution, and it updates its different counters. More particularly, the counter SessionCnt is, then, incremented.

During step 603, the authentication method fails and stops. Peripheral device 202 send a response STOPPeriRsp to the host device 203, and the next step is a step 605 (STOP), executed by the host device 203 wherein the host device acknowledges that the peripheral device does not want to pursue an authentication method with the companion device 201. Step 605 is followed by operation 502 described in relation with FIG. 5. For example, the peripheral device 202 can update its pairing table.

During step 604, peripheral device 202 is in a pending state, and decides to pursue the authentication method with companion 201. The peripheral device 202 sends a response CONTINUEPeriRsp to the host device 203. Response CONTINUEPeriRsp comprises the identifier IDPeri of the peripheral device 202, and the last value of the counter SessionCnt. The next step is a step 606 (START ID), executed by the host device 203.

During step 606, the host device 203 acknowledges that the peripheral device wants to pursue an authentication method with the companion device 201, and receives the response CONTINUEPeriRSP. Moreover, the host device 203 initiates the authentication method on the side of the companion device 201 by sending it a command StartCompCmd. The command StartCompCmd comprises the identifier IDPeri of the peripheral device 202, the key KId, and the last value of the counter SessionCnt.

At a step 607 (ID?), executed by the companion device 201, and following the step 606, the companion device 201 has received the command StartCompCmd and decides if it wants to start the authentication method with peripheral device 202. For that matter, the companion device 201 execute one or more verifications.

According to an embodiment, the companion device 201 verifies if the identifier IDPeri and the shared key ShBK is in its pairing table.

If the companion device 201 finds the identifier IDPeri and/or the associated shared key ShBK in its pairing table, it means that the companion device 201 have already been in contact, at least once, with the peripheral device 202. Moreover, if the companion device 201 finds the identifier IDPeri in its pairing table, the companion device 201 verifies the value the SessionCnt stored in association with the identifier IDPeri. If the value of the counter SessionCnt received with the command StartCompCmd is equal or higher to the value of the counter SessionCnt stored in the pairing table of the companion device 201, it means that the peripheral device is not malicious. Then, the next step is a step 608 (NOM) executed by the companion device 201. If the value of the counter SessionCnt received with the command StartCompCmd is lower than or equal to the value of the counter SessionCnt stored in the pairing table of the companion device 201, it means that the peripheral device is malicious. As a matter of fact, the counter SessionCnt is never decremented, so the value of the counter SessionCnt is only supposed to increase. Then, the next step is a step 612 (STOP) executed by the companion device 201.

If the companion device 201 does not find the identifier IDPeri in its pairing table, it means that the companion device 202 have never been in contact with the peripheral device 202 or has forgotten that it has already been in contact with the peripheral device 202. Then, the companion device 610 indicates that a pairing operation is needed to pursue the authentication method. The next step is a step 610 (PAIR).

If the companion device 201 detects an error with the identifier IDPeri, the next step is a step 612 (STOP) executed by the companion device 201.

During step 608, the companion device 201 sends a response NomRsp to the host device 203 indicating that the next operation is the nominal operation 504. A structure of response NomRsp is described in more details in connection with FIG. 7. The next step is a step 609 (NOM) executed by the host device 203 wherein the host device 203 prepares the nominal operation 504.

During step 610, executed by the companion device 201, wherein the companion device sends a response PairRsp to the host device 203. A structure of response PairRsp is described in more details in connection with FIG. 7. The next step is a step 611 (PAIR), executed by the host device 203, wherein the host device 203 acknowledges that the companion device wants to pursue an authentication method with the peripheral device 202. The next operation is the pairing operation 503.

During step 612, the authentication method fails and stops. The companion device sends a response StopRsp to the host device 203, and the next step is a step 613 (STOP), executed by the host device 203 wherein the host device acknowledges that the companion device does not want to pursue an authentication method with the peripheral device 202. A structure of response StopRsp is described in more details in connection with FIG. 7. The next operation is the operation 502.

Figure 7:
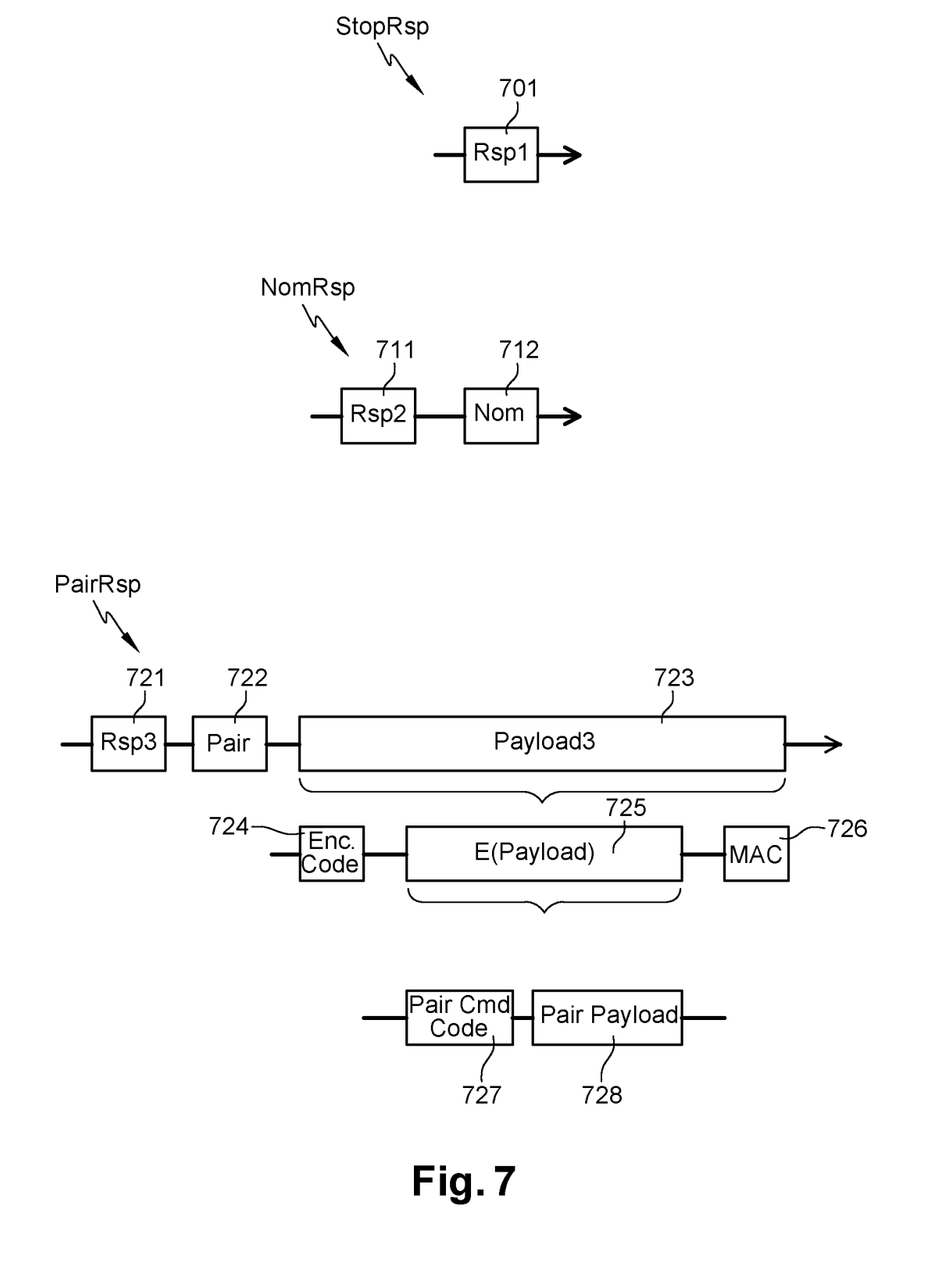
FIG. 7 shows, schematically and in block form, an embodiment of structures of exchanged responses.

FIG. 7 shows, schematically and in block form, an embodiment of structures of responses StopRsp, NomRsp and PairRsp described in relation with FIG. 6.

Response StopRsp is of type of response 420 described in relation with FIG. 4. Response StopRsp is generated by companion device 201 when it decides that it does not want to pursue the authentication method after receiving the identifier IDPeri, during step 612 described in relation with FIG. 6. Response StopRsp is sent to the host device 203. Response StopRsp is one of the possible response to the command StartCompCmd sent by the host device 203.

Response StopRsp is only composed of a response code field comprising a response code 701 (Rsp1) indicating that the authentication method is over.

Response NomRsp is of type of response 420 described in relation with FIG. 4. Response NomRsp is generated by companion device 201 when it decides that it already knows the peripheral device 202 and that they trust each other, during step 608 described in relation with FIG. 6. Response NomRsp is sent to the host device 203. Response NomRsp is one of the possible response to the command StartCompCmd sent by the host device 203.

Response NomRsp is composed of a response code field, comprising a response code 711 (Rsp2), followed directly by a payload filed comprising a status data 712 (Nom). The response code 711 indicates that the authentication method will continue. The status data 712 indicates to the host device 203 that the next operation is the nominal operation 504, and, then, the next step is step 609. When the host device 203 receives the response NomRsp, the host device 203 understands that it remains the master device of the communication and that it is in charge of the initialization of the nominal operation.

Response PairRsp is generated by companion device 201 when it decides that it wants to pursue the authentication method with peripheral device 202, during step 610 described in relation with FIG. 6. Response PairRsp is sent to the host device 203. Response PairRsp is one of the possible response to the command StartCompCmd sent by the host device 203.

Response PairRsp is of type of response 420 described in relation with FIG. 4. Response PairRsp is composed of a response code field comprising a response code 721 (Rsp3) followed directly by a payload field comprising a status data 722 (Cmd Code 3) and a data 723 (Payload3). Status data 722 and data 723 are considered as parameters associated with the response code 721. The response code 721 indicates that the authentication method will continue. The status data 722 indicates to the host device 203 that the next operation is the pairing operation 503, and, then, the next step is step 611. According to a variant, the status data 722 is not present. Data 723 comprises an encrypted command intended for the peripheral device 202 and comprising data used during the pairing operation 503. When the host device 203 receives the response PairRsp, the host device 203 understands that it becomes a slave device of the communication and that it is in charge anymore of driving the communication. Afterwards, the host device 203 transfer the data 723 to the peripheral device 202.

More particularly, and according to an embodiment, the data 723 comprises an encrypted command of the type of the encrypted command 440 described in relation with FIG. 4. Data 723, or encrypted command 723, is encrypted by using a key derived from the key KId. Thus, the data 723 is composed of, strictly in the following order:
- a data 724 (Enc Code), or encryption code 724, indicating that the data 723 is an encrypted command, data 724 is not encrypted;
- an encrypted data 725 (E(Payload)), or encrypted payload 725, that represents the encrypted command; and
- a data 726 (MAC) that represents a message authentication code in relation with the encryption of the command.

Moreover, when the data 725 is decrypted, it comprises, strictly in the following order:
- a data 727 (Enc Code), or command code 727, which indicates the type of the command; and
- a data 728 (E(Payload)), or payload 725, that comprises parameters and/or data used for executing the command.

An advantage of using an encrypted data stored in a response is to avoid any leakage of parameters and/or data used for executing the command. As a matter of fact, the host device 203 being the one that transfers responses and commands between the companion device 201 and the peripheral device 202, a malicious person could try to hack the host device 203 to retrieve secret or sensitive data. It is not possible with the embodiment, because the secret or sensitive data is stored in the data 728 which is encrypted.

Figure 8:
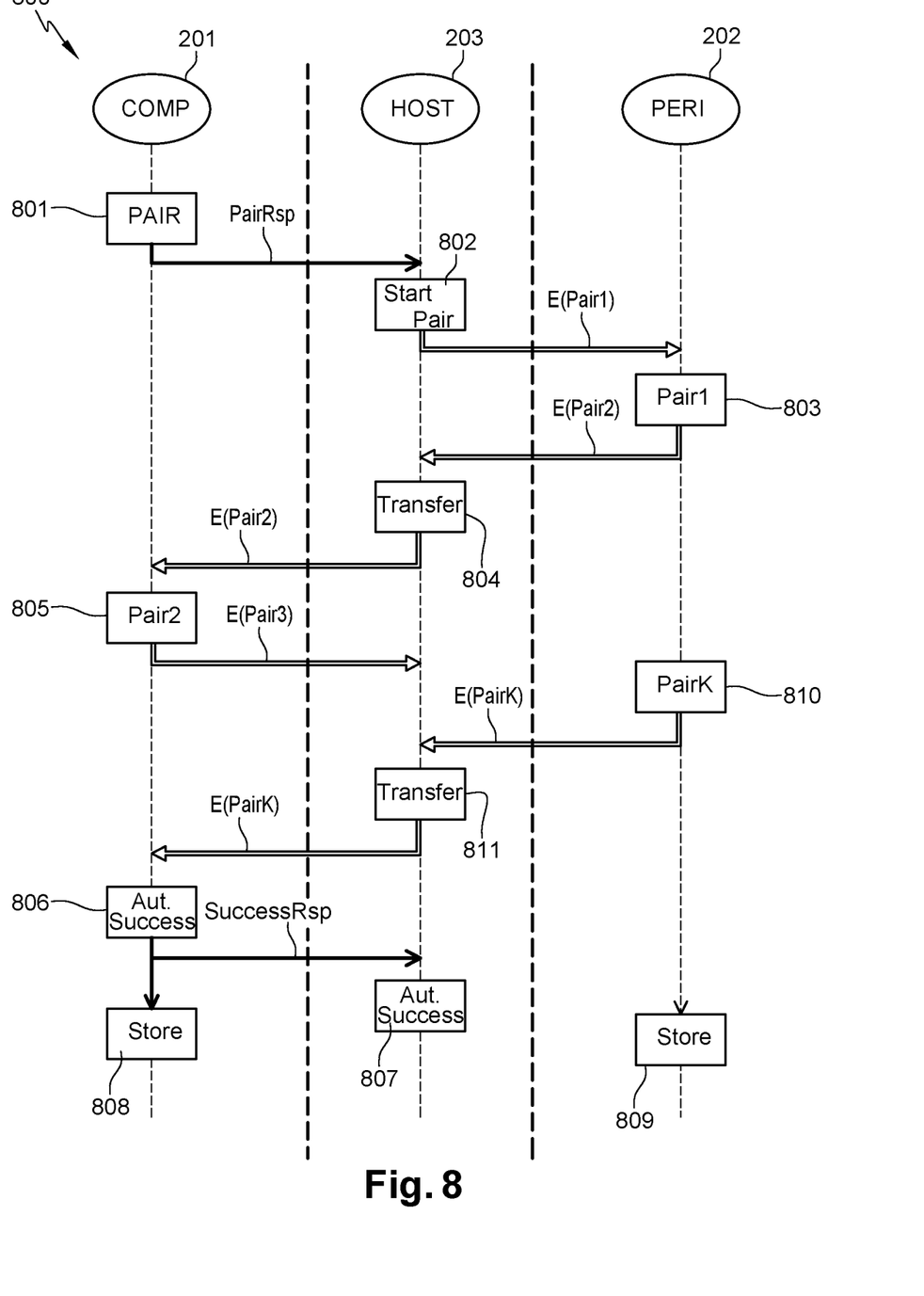
FIG. 8 shows a block diagram illustrating another part of an embodiment an authentication method.

FIG. 8 shows a block diagram illustrating in more details an example of an embodiment of a pairing operation 800 executed by the system 200 described in relation with FIG. 2 and using commands and responses described in relation with FIG. 4. The pairing operation 600 is of the type of pairing operation 503 described is connection with FIG. 5.

The pairing operation 800 is initiated with a step 801 (Pair) of the type of step 610 described in relation with FIG. 6. During step 801, the companion device 201 sends the response PairRsp to the host device 203. Response PairRsp is described in details relation with FIG. 7.

At a step 802 (Start Pair), following step 801 and executed by the host device 203, the host device 203 becomes a slave device of the communication. The host device 203 transfers only a part of the response PairRsp to the peripheral device 202. More particularly, the host device 203 transfer an encrypted command E(Pair1) to the peripheral device 202, the encrypted command E(Pair1) corresponding to the data 723 described in relation with FIG. 7. Furthermore, the host device 203 does not try to execute the encrypted command and transfers it directly. More particularly, when the host device 203 receives an encrypted data, it reads the encrypted command code as a transfer command.

The encrypted command E(Pair1) is of the type of the encrypted command 400 described in relation with FIG. 4, meaning the encrypted command E(Pair1) comprises, strictly in the following order:
- a command code indicating that the encrypted command E(Pair1) is an encrypted command;
- a encrypted data corresponding to the encrypted command itself; and
- a data representing a message authentication code in relation with the encryption of the encrypted command E(Pair1).

Moreover, and according to an embodiment, the command code of the encrypted command E(Pair1), and to each encrypted command exchanged between the companion device 201 and the peripheral device 201, indicates to the host device 203 that it should transfer the encrypted command without trying to decode or to decrypt the encrypted payload. This way, the host device 203 knows that it is a slave device of the communication.

Once it is decrypted, the encrypted data is composed of a command code indicating the type of the encrypted data, and of a data comprising parameters associated with the encrypted data.

At a pairing step 803 (Pain), following step 802 and executed by the peripheral device 202, the peripheral device 202 receives the encrypted data E(Pair1) and execute a first concrete pairing action of the pairing operation 800, using one or more data comprised in the encrypted command E(Pair1). According to an example, during step 803, the peripheral device 202 can execute a part of a Verifier-Prover type authentication method, or a part of an encrypted Verifier-Prover type authentication method. More particularly, the peripheral device 202, respectively the companion device 201, can perform cryptographic operations, using various internal secret data and/or parameters received in the commands send by the companion device 201, respectively the peripheral device 202.

At the end of the pairing action, the peripheral device 202 generates an encrypted command E(Pair2) intended for the companion device 201 and sends it to the host device 203 for transfer. Encrypted command E(Pair2) comprises, for example, data that represent one or more results of action of step 803 and/or data intended to be used during a subsequent action. According to a practical example, the peripheral device 202 generates the encrypted command E(Pair2) by encrypting a response of the type of response 420 of FIG. 4, and filing the encrypted payload field of an encrypted command of the type of command 440 of FIG. 4 with it. The command code of the pairing command is the same as the command code of command E(Pair1).

At a step 804 (Transfer), following step 803 and executed by the host device 203, the host device 203 receives the encrypted command E(Pair2). As the before, the host device is not the master of the communication anymore, its only role is to transfer data, command and/or response, between the peripheral device 202 and the companion device 201. In consequence, the host device 203 transfers the encrypted command E(Pair2) to the companion device 201 without any modification, and without trying to decode or decrypt it.

At another pairing step 805 (Pair2), following step 804 and executed by the companion device 201, the companion device 201 receives the encrypted command E(Pair2) and executes a second concrete pairing action of the pairing operation 800, using one or more data comprised in the encrypted command E(Pair2). According to an example, during step 805, the companion device 202 can execute another part of a Verifier-Prover type authentication method, or another part of an encrypted Verifier-Prover type authentication method, in response to the part executed by the peripheral device 202 previously.

At the end of the pairing action, the companion device 201 generates an encrypted command E(Pair3) intended for the peripheral device 202 and sends it to the host device 203 for transfer. Encrypted command E(Pair3) comprises, for example, data representing one or more results of action of step 805 and/or data intended to be used during a subsequent action.

This encrypted command E(Pair3) is then transferred, by the host device 203 to the peripheral device 202. The companion device 201 and the peripheral device 202 continues to exchanged encrypted data with the previous mechanism until they finally determine that they can trust each other and until they are able to furnish a shared encryption and or decryption Key ShKey that they can used for future encrypted communication.

Moreover, at each pairing step, one of the devices 201, 202 is capable to stop the pairing operation if an encrypted command is not correct, or if the encrypted command comprises erroneous data.

At the last pairing step 810 (PairK) executed on the side of the peripheral device 202, the peripheral device 202 sends a last encrypted command E(PairK) to the companion device 202, via the host device 203. Step 810 being the last pairing step, the peripheral can execute then a step 809 (Store) wherein peripheral devices updates its pairing tables with data obtained during the pairing operation 800.

At a step 811 (Transfer), following step 810 and executed by the host device 203, the host device 203 receives the encrypted command E(PairK). The host device 203 transfers the encrypted command E(PairK) to the companion device 201 without any modification. The next step is a step 806 (Aut. Success).

During step 806, the companion device 201 and/or the peripheral device 202 decide that they can trust each other. A success response SuccessRsp is sent to the host device 203 for a step 807 (Aut. Success) wherein the host device is informed of the success of the authentication method. In FIG. 8, step 806 is executed by the companion device 201, but in an alternative embodiment, the peripheral device can execute step 806.

After step 806, companion device 201 executes a step 808 (Store) similar to the step 810, wherein companion device 201 updates its pairing tables with data obtained during the pairing operation 800. More particularly, the companion device 201 stores the identifier IDPeri and the shared encryption and or decryption Key ShKey.

Furthermore, even if it is not represented in FIG. 8, in order not to overload the figure, companion device 201 and peripheral device 202 may conclude during the execution of one step of the pairing operation that they can not trust each other. In that case, the authentication method fails and is stopped by one of the companion device 201 or the peripheral device 202. The host device 203 initiates the operation 502.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

What is claimed is:

1. A method of performing an authentication method and a pairing of a peripheral device to a companion device, the method comprising:
receiving, by the companion device, a first identifier and a first value of a first counter from the peripheral device;
verifying, by the companion device, whether a pairing table stored in the companion device contains the first identifier;
when the pairing table does not include the first identifier, initiating, by the companion device, a pairing session;
when the pairing table includes the first identifier, performing, by the companion device, the steps of:
comparing the first value to a second value associated with the first identifier in the pairing table;
in response to the first value being greater than the second value, initiating a nominal session; and
in response to the first value being lower than or equal to the second value, stopping execution of the method.

2. The method according to claim 1, further comprising exchanging data between the peripheral device and the companion device in order to verify whether the peripheral device and the companion device can be paired together or not.

3. The method according to claim 1, further comprising generating a shared key by the peripheral device and the companion device.

4. The method according to claim 3, further comprising pairing the peripheral device and the companion device so that the peripheral device and the companion device use the shared key.

5. The method according to claim 1, further comprising exchanging encrypted commands between the peripheral device and the companion device.

6. The method according to claim 1, further comprising conducting the nominal session after the peripheral device and the companion device been paired together previously, the peripheral device has stored a second identifier associated to the companion device and a shared key, and the companion device has stored the shared key.

7. The method according to claim 6, wherein the shared key has been produced during a previous successful pairing session executed by the peripheral device and the companion device.

8. The method according to claim 1, wherein the first counter is incremented at each attempt of execution of the authentication method.

9. The method according to claim 1, further comprising storing, by the companion device, the first identifier and the first value when the pairing table does not include the first identifier.

10. The method according to claim 1, wherein the peripheral device and the companion device communicate with each other via a host device.

11. The method according to claim 10, wherein further comprising sending a second identifier associated with the companion device from the host device to the peripheral device.

12. The method according to claim 11, further comprising determining, by the peripheral device, whether the peripheral device has previously stored the second identifier.

13. The method according to claim 12, wherein determining whether the peripheral device has previously stored the second identifier comprises determining that the peripheral device has not previously stored the second identifier, the method further comprising comparing, by the peripheral device, the first value to a first threshold value.

14. The method according to claim 13, further comprising sending the first identifier and the first value from the peripheral device to the companion device in response to the peripheral device determining that the first value is lower than the first threshold value.

15. The method according to claim 13, further comprising stopping execution of the authentication method by the peripheral device in response to the peripheral device determining that the first value is not lower than the first threshold value.

16. The method according to claim 12, further comprising storing the second identifier by the peripheral device in response to determining that the peripheral device has not previously stored the second identifier.

17. The method according to claim 12, further comprising performing, by the peripheral device, a verification step in response to determining that the peripheral device has previously stored the second identifier.

18. The method according to claim 17, wherein performing the verification step comprises verifying that first data is stored with the second identifier.

19. The method according to claim 18, wherein the first data stored is the second value, which is from a second counter.

20. The method according to claim 19, wherein the second counter is incremented at each attempt of execution of the authentication method with the companion device.

21. The method according to claim 19, wherein performing the verification step comprises the peripheral device comparing the second value to a second threshold value.

22. The method according to claim 21, further comprising sending the first identifier and the first value from the peripheral device to the companion device in response to the second value being lower than a first threshold value.

23. The method according to claim 21, further comprising stopping execution of the authentication method by the peripheral device in response to the second value being equal or greater than the second threshold value.

24. The method according to claim 21, wherein, the second threshold value is between one and five.

25. The method according to claim 24, wherein, the second threshold value is equal to three.

26. The method according to claim 1, wherein the companion device is a circuit for a printer.

27. The method according to claim 1, wherein the peripheral device is a circuit for an ink cartridge.

28. A non-transitory computer-readable medium storing a program that, when executed by a microprocessor in an electronic device, causes the microprocessor to perform the method according to claim 1.

29. An electronic device configured to be a companion device in an authentication method in which a peripheral device is paired with the companion device, the electronic device comprising:
- a receiver communicatively couplable to the peripheral device;
- a pairing table memory storing a pairing table;
- a processor; and
- a memory coupled to the processor and storing program code that, when executed by the processor, causes the processor to:
  - verify whether the pairing table contains a first identifier that was received from the peripheral device;
  - when the pairing table does not include the first identifier, initiate a pairing session;
  - when the pairing table includes the first identifier:
    - compare a first value that was received from the peripheral device to a second value associated with the first identifier in the pairing table;
    - in response to the first value being greater than the second value, initiate a nominal session; and
    - in response to the first value being lower than or equal to the second value, the companion device stop execution of the authentication method.

30. An electronic system comprising:
- a peripheral device; and
- a companion device;
- wherein the peripheral device and the companion device are configured to implement an authentication method to pair the peripheral device to the companion device; and
- wherein the authentication method comprises:
  - sending a first identifier and a first value of a first counter from the peripheral device to the companion device; and
  - verifying, by the companion device, whether a pairing table in the companion device includes the first identifier;
  - when the pairing table does not include the first identifier, initiating, by the companion device, a pairing session;
  - when the pairing table includes the first identifier, performing by the companion device the steps of:
    - comparing the first value to a second value associated to the first identifier in the pairing table;
    - in response to the first value being greater than the second value, initiating a nominal session; and
    - in response to the first value being lower than or equal to the second value, stopping execution of the authentication method.

* * * * *